(12) United States Patent
Watanabe et al.

(10) Patent No.: US 7,308,912 B2
(45) Date of Patent: Dec. 18, 2007

(54) FUEL TUBE

(75) Inventors: Kazuya Watanabe, Aichi (JP); Masaki Koike, Aichi (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 89 days.

(21) Appl. No.: 11/094,674

(22) Filed: Mar. 31, 2005

(65) Prior Publication Data

US 2005/0217745 A1 Oct. 6, 2005

(30) Foreign Application Priority Data

Mar. 31, 2004 (JP) ............................ P2004-108580

(51) Int. Cl.
*F16L 11/00* (2006.01)

(52) U.S. Cl. ..................... 138/137; 138/141; 428/36.91

(58) Field of Classification Search ................ 138/137, 138/141; 428/36.91
See application file for complete search history.

(56) References Cited

U.S. PATENT DOCUMENTS

| | | | |
|---|---|---|---|
| 5,489,455 A * | 2/1996 | Nugent et al. ........... 428/36.91 |
| 5,588,468 A * | 12/1996 | Pfleger ........................ 138/121 |
| 5,763,034 A * | 6/1998 | Nishino et al. .......... 428/36.91 |
| 6,177,162 B1 | 1/2001 | Siour et al. |
| 6,576,312 B1 * | 6/2003 | Ito et al. .................. 428/36.91 |
| 6,830,792 B1 * | 12/2004 | Matsuoka et al. ......... 428/35.7 |
| 6,941,975 B2 * | 9/2005 | Wilson et al. .............. 138/141 |
| 6,989,198 B2 * | 1/2006 | Masuda et al. .......... 428/474.9 |
| 2003/0077411 A1 * | 4/2003 | Hibino et al. ............ 428/36.91 |
| 2003/0118766 A1 | 6/2003 | Koike et al. |
| 2003/0165699 A1 | 9/2003 | Lacroix |
| 2003/0226608 A1 * | 12/2003 | Ainsworth ................... 138/137 |
| 2004/0040607 A1 * | 3/2004 | Wilson et al. .............. 138/137 |
| 2004/0191440 A1 * | 9/2004 | Funaki et al. .............. 428/34.6 |

FOREIGN PATENT DOCUMENTS

| | | |
|---|---|---|
| EP | 1 223 030 A2 | 7/2002 |
| JP | A-04-86257 | 3/1992 |
| JP | A-10-138372 | 5/1998 |
| JP | A-2000-329266 | 11/2000 |

OTHER PUBLICATIONS

European Search Report issued from European Patent Office on Aug. 2, 2005 for the corresponding European patent application No. 05006967.3-2124.

* cited by examiner

*Primary Examiner*—James Hook
(74) *Attorney, Agent, or Firm*—Posz Law Group, PLC

(57) ABSTRACT

A fuel tube including a laminate of an inner layer and an outer layer, the inner layer being made of a resin composition containing a PPS resin (or an MXD6 resin) as a main component but substantially containing no olefin polymer component, the outer layer being made of a resin composition containing a PPS resin (or an MXD6 resin) as a main component and substantially containing an olefin polymer component, wherein the inner layer and the outer layer are laminated so as to be substantially self-bonded to each other without interposition of any adhesive agent.

8 Claims, 2 Drawing Sheets

FUEL TUBE

This application is based on Japanese Patent Application No. 2004-108580, which is incorporated herein by reference.

BACKGROUND OF THE INVENTION

1. Field of the Invention

The present invention relates to a fuel tube in which fuel such as gasoline, alcohol gasoline or sour gasoline flows.

2. Description of the Related Art

There is a demand for a fuel tube having a good balance between the two characteristics of low permeability to fuel such as gasoline and high flexibility for handling property. Although fuel permeability of the fuel tube can be reduced when a low fuel permeability resin such as a polyphenylene sulfide resin (hereinafter referred to as PPS resin) or a polymetaxylylene adipamide resin (hereinafter referred to as MXD6 resin) is used for forming the fuel tube, the fuel tube lacks flexibility because a material low in fuel permeability is generally high in elastic modulus. The easiest method for improving the flexibility is to use a mixture composition prepared by adding an elastomer component to a low fuel permeability resin. In this method, however, fuel permeability becomes high.

Therefore, an intention to laminate an inner layer of a low fuel permeability resin and an outer layer of a low elastic modulus material has been heretofore examined to obtain a good balance between the two characteristics. For example, a fuel tube having an inner layer made of a PPS resin and a functional group-containing thermoplastic resin, and an outer layer made of another thermoplastic resin than the PPS resin has been described in JP-A-10-138372. A fuel tube having an inner layer made of a resin composition containing a metaxylylene group-containing polyamide resin and a modified polyester elastomer, and an outer layer made of a polyester elastomer has been described in JP-A-4-86257. A fuel tube having an inner layer made of a low fuel permeability resin such as a PPS resin, and an outer layer made of a thermoplastic elastomer has been described in JP2000-329266A.

In such a fuel tube produced by lamination, the inner layer and the outer layer need to be bonded to each other by sufficient interlayer adhesive power so as not to be separated easily. It is however impossible to obtain sufficient interlayer adhesive power between the inner layer and the outer layer self-bonded to each other by direct contact because adhesion between the material of the inner layer and the material of the outer layer in the fuel tube produced by lamination in the related art low. It is therefore necessary to interpose an adhesive agent between the inner layer and the outer layer or add an adhesive agent into each of the materials of the inner and outer layers.

SUMMARY OF THE INVENTION

To solve the aforementioned problem, an object of the invention is to provide a fuel tube in which a good balance between the two characteristics of low fuel permeability and high flexibility can be attained by lamination and in which an inner layer and an outer layer can be self-bonded to each other by sufficient interlayer adhesive power without interposition/addition of any adhesive agent.

The invention provides a fuel tube including a laminate of an inner layer made of a resin composition containing a low fuel permeability resin as a main component and containing substantially no olefin polymer component, and an outer layer being made of a resin composition containing the low fuel permeability resin as a main component and containing substantially an olefin polymer component, wherein the inner layer and the outer layer are substantially self-bonded to each other without an adhesive agent. The phrase "containing substantially no olefin polymer component" implies the case where a small amount of olefin copolymer component to exert no influence on fuel permeability may be contained, besides the case where no olefin polymer component is contained. The phrase "containing substantially an olefin polymer component" implies the case where a sufficient amount of olefin polymer component to reduce the elastic modulus is contained.

In the fuel tube according to the invention, a good balance between the two characteristics of low fuel permeability and high flexibility can be attained by lamination. Moreover, there is an effect that the inner and outer layers can be self-bonded to each other by sufficient interlayer adhesive power without interposition/addition of any adhesive agent.

DETAILED DESCRIPTION OF THE PREFERRED EMBODIMENT

Figure 1A:
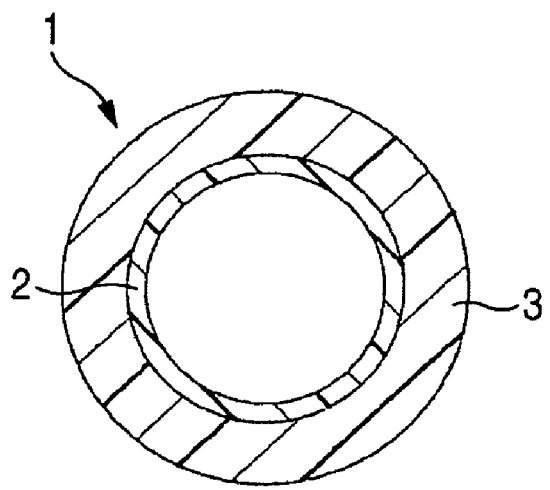
FIGS. 1A to 1C are sectional views showing fuel tubes according to Examples and Comparative Examples.

A fuel tube includes a laminate of an inner layer and an outer layer, the inner layer being made of a resin composition containing a low fuel permeability resin (preferably, a PPS resin or an MXD6 resin) as a main component but substantially containing no olefin polymer component, the outer layer being made of a resin composition containing the same low fuel permeability resin as the low fuel permeability resin of the inner layer as a main component and substantially containing an olefin polymer component, wherein the inner layer and the outer layer are laminated so as to be substantially self-bonded to each other without interposition of any adhesive agent. Preferably, the amount of the olefin polymer component is from 20 to 60% by weight.

The low fuel permeability resin is not particularly limited but a PPS resin or an MXD6 resin is preferred.

[PPS Resin]

The PPS resin used in each of the inner and outer layers in this invention is a polymer having a constitutional repeating unit represented by the following structural formula 1. From the point of view of heat resistance, a PPS resin containing 70 mol % or more of the polymer having the constitutional repeating unit is preferred and a PPS resin containing 90 mol % or more of the polymer having the constitutional repeating unit is especially preferred.

[Chemical Formula 1]

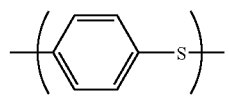

About 30 mol % or less of the constitutional repeating unit in the PPS resin may be replaced by a constitutional repeating unit having any one of the following structures. A PPS polymer partially having such a structure may be preferred from the point of view of moldability because the melting point of the PPS polymer is reduced.

[Chemical Formula 2]

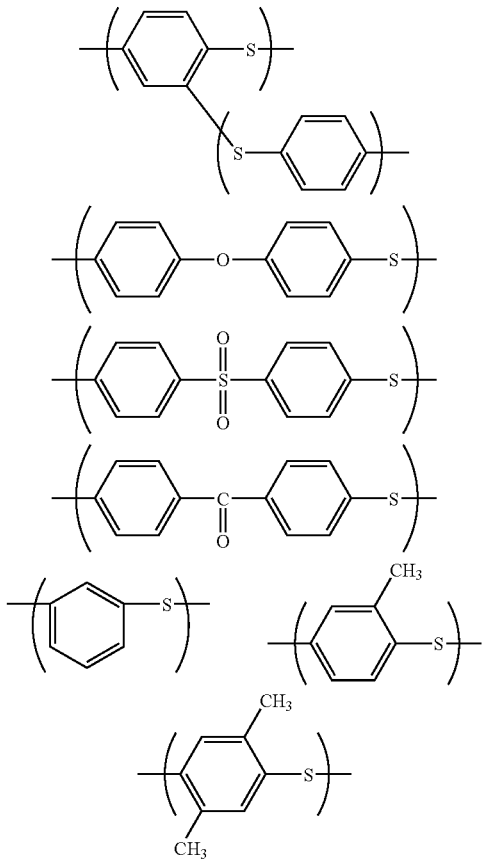

[MXD6 Resin]

The MXD6 resin used in each of the inner and outer layers in this invention is a polyamide resin prepared from metaxylylene diamine and adipic acid. A polyamide resin having an average molecular weight of 20000 or higher is preferred and a polyamide resin having an average molecular weight of 30000 or higher is especially preferred.

[Olefin Polymer Component]

For example, the olefin polymer component used on the outer layer side in the case where the low fuel permeability resin is a PPS resin is a combination of an epoxy group-containing olefin polymer and an ethylene-α-olefin copolymer. The epoxy group-containing olefin polymer is an olefin polymer having an epoxy group in a molecule. Specific examples of the epoxy group-containing olefin polymer include glycidyl acrylate, glycidyl methacrylate, and glycidyl ethacrylate. Especially, an ethylene-glycidyl methacrylate copolymer is preferred. On the other hand, α-olefin in the ethylene-α-olefin copolymer preferably has 4-20 carbon atoms. Especially, an ethylene-butene copolymer is preferred. That is, the preferred combination is an ethylene-glycidyl methacrylate copolymer and an ethylene-butene copolymer. The weight ratio of the two is preferably selected to be from 1:3.3 to 1:7.6.

The olefin polymer component used on the outer layer side in the case where the low fuel permeability resin is an MXD6 resin is a carboxylic anhydride- or carboxylic acid-modified elastomer of at least one member selected from the group consisting of polyolefin, polyethylene copolymer, hydrogenated styrene-ethylene-butadiene block copolymer, polyester-polyester block copolymer, and polyester-polyether block copolymer. Specific examples of the MXD6 resin include carboxylic anhydride- or carboxylic acid-modified elastomers of polyethylene, polypropylene, ethylene-α-olefin copolymer, ethylene-diene copolymer, ethylene-acrylic ester copolymer, ethylene-methacrylic ester copolymer, ethylene-acrylic acid-methacrylic acid copolymer, ethylene-methacrylate copolymer, ethylene-vinyl acetate copolymer, saponified ethylene-vinyl acetate copolymer, polybutylene terephthalate-polybutylene adipate block copolymer, polybutylene terephthalate-polylactone copolymer, polyethylene terephthalate-polyalkylene glycol copolymer, etc. For example, this modification is made by organic peroxide and unsaturated acid such as maleic acid, methacrylic acid, acrylic acid or maleic anhydride. Preferably, acid-modified ethylene-α-olefin copolymer can be used. Especially preferably, maleic acid-modified ethylene-butene copolymer can be used.

The amount of the olefin copolymer component is not particularly limited but may be selected to be preferably in a range of from 20 to 60% by weight, especially preferably in a range from 30 to 50% by weight. If the amount of the olefin copolymer component is smaller than 20% by weight, the flexibility shows a tendency toward decrease because the elastic modulus becomes high. If the amount of the olefin copolymer component is larger than 60% by weight, heat resistance or chemical resistance shows a tendency toward decrease.

[Other Additives in Resin Composition for Inner or Outer Layer]

Although the resin composition used in the invention includes the low fuel permeability resin (preferably PPS resin or MXD6 resin) as a main component, additives which will be described below may be mixed.

1. Another Resin than PPS Resin

Besides the PPS resin, another resin except the olefin resin can be added if the effect of the invention is not spoilt. For example, both flexibility and impact resistance can be improved more greatly when a small amount of a flexible thermoplastic resin is added. However, if the amount of the flexible thermoplastic resin is larger than 20% by weight with respect to the total amount of the composition, the original characteristic of the PPS resin may be spoilt undesirably. Accordingly, the amount of the flexible thermoplastic resin is selected to be preferably not larger than 10% by weight, especially preferably not larger than 1% by weight. Specific examples of the thermoplastic resin include a polyamide resin, a polybutylene terephthalate resin, a polyethylene terephthalate resin, a modified polyphenylene ether resin, a polysulfone resin, a polyallyl sulfone resin, a polyketone resin, a polyether-imide resin, a polyallylate resin, a liquid crystal polymer, a polyether-sulfone resin, a polyether-ketone resin, a polythioether-ketone resin, a polyether-ether-ketone resin, a polyimide resin, a polyamideimide resin, a polyethylene tetrafluoride resin, etc.

2. Another Resin than MXD6 Resin

A polyamide resin can be added as another resin than the MXD6resin if the effect of the invention is not spoilt. Examples of an amine component of the polyamide resin include metaxylylene diamine, paraxylylene diamine, ethylene diamine, tetramethylene diamine, hexamethylene diamine, nonamethylene diamine, undecamethylene diamine, dodecamethylene diamine, etc. The amine component is not limited thereto. Aliphatic dicarboxylic acid such as adipic acid or sebacic acid is used as an acid component of the polyamide resin. These polyamide resins may be copolymerized with ε-caprolactam, 6-aminocaproic acid, ω-enantholactam, α-pyrrolidone, etc. or may be blended with these polymers.

3. Plasticizer

Sulfonamide can be used as the plasticizer added to the MXD6 resin by way of example. Examples of the sulfonamide include N-propyl-benzene sulfonamide, N-butyl-benzene sulfonamide, N-hexyl-benzene sulfonamide, N-octyl-benzene sulfonamide, N-phenyl-benzene sulfonamide, N-dimethylphenyl-benzene sulfonamide, N-isopropylphenyl-benzene sulfonamide, N-butylphenyl-benzene sulfonamide, N-methyl-methylbenzene sulfonamide, N-ethyl-methylbenzene sulfonamide, N-butyl-methylbenzene sulfonamide, N-butyl-butylbenzene sulfonamide, N-butyl-isopropylbenzene sulfonamide, N-phenyl-methylbenzene sulfonamide, N-dimethylphenyl-methylbenzene sulfonamide, and N-isopropylphenyl-methylbenzene sulfonamide. The amount of the plasticizer added is selected to be preferably in a range of from 1 to 15% by weight, especially preferably in a range of from 1 to 10% by weight.

4. Anti-Oxidant

An anti-oxidant such as a phenyl compound or a phosphorus compound may be preferably added in order to keep high heat resistance and heat stability.

5. Modifying Compound

A general additive such as a coupling agent, a crystal seed agent, metal soap, a releasant, a color protecting agent, a lubricant, an ultraviolet-protecting agent, a colorant, a flame retardant, a foaming agent, an electrically conducting agent, etc. can be mixed as a modifying agent. Another layer having any one of the characteristics of these agents may be added.

6. Filler

A filler (e.g. fiber filler such as glass fiber or aramid fiber, non-fiber filler such as talc, wollastonite, zeolite, clay, silica or graphite, and so on) can be mixed if the effect of the invention is not spoilt.

[Thickness of Inner Layer]

The thickness of the inner layer is not particularly limited but may be preferably selected to be in a range of from 0.05 to 0.4 mm. If the thickness is smaller than 0.05 mm, fuel permeability shows a tendency toward increase. If the thickness is larger than 0.4 mm, flexibility shows a tendency toward decrease. Incidentally, the thickness of the outer layer is not particularly limited.

[Shape of Fuel Tube]

The shape of the fuel tube is not limited to a smooth cylindrical shape and may include the case where at least one part of the fuel tube is shaped like a bellows.

EXAMPLES

Figure 1B:
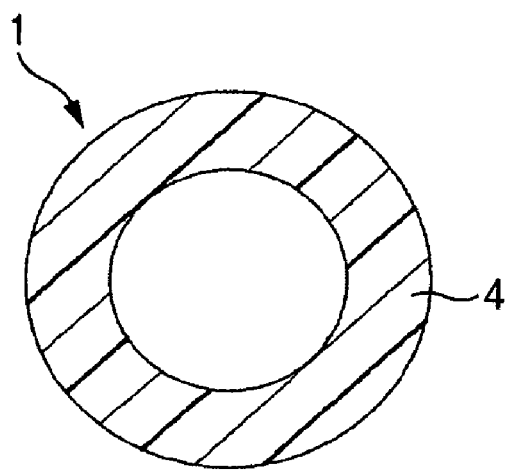
Figure 1C:
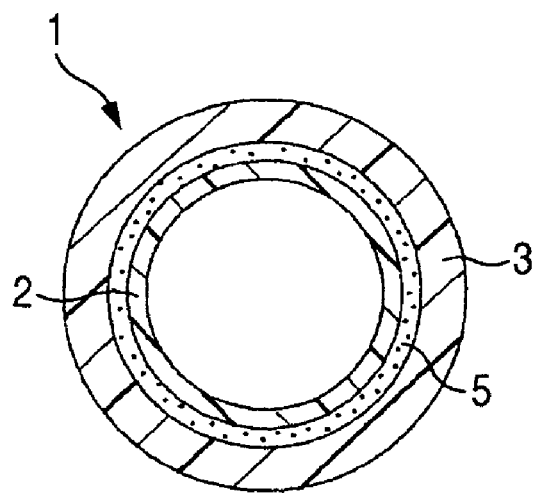

Resin compositions shown in Tables 1 to 4 were used as Examples and Comparative Examples. A fuel tube 1 having an inner diameter of 6 mm and an outer diameter of 8 mm as shown in FIGS. 1A to 1C was produced from each of the resin compositions. FIG. 1A shows the case where the inner layer 2 and the outer layer 3 are laminated so as to be bonded to each other without interposition of any adhesive agent. This case corresponds to each of Examples 1-1 to 1-6, Examples 2-1 to 2-6 and Comparative Examples 4 and 5. FIG. 1B shows the case where the fuel tube 1 has a single layer 4. This case corresponds to each of Comparative Examples 1-1 to 1-3, Comparative Examples 2-1 to 2-3 and Comparative Example 3. FIG. 1C shows the case where the inner layer 2 and the outer layer 3 are laminated substantially through an adhesive agent 5 and bonded to each other by the adhesive agent 5. This case corresponds to Comparative Example 6.

TABLE 1

| | | Example | | | | | |
|---|---|---|---|---|---|---|---|
| | | 1-1 | 1-2 | 1-3 | 1-4 | 1-5 | 1-6 |
| Inner layer | Composition PPS (wt %) | 100 | 100 | 100 | 100 | 100 | 100 |
| | Single elastic modulus (MPa) | 3300 | 3300 | 3300 | 3300 | 3300 | 3300 |
| | Layer thickness (mm) | 0.1 | 0.1 | 0.2 | 0.2 | 0.3 | 0.4 |
| Outer layer | Composition PPS (wt %) | 70 | 60 | 60 | 50 | 50 | 50 |
| | Olefin polymer component (wt %) | 30 | 40 | 40 | 50 | 50 | 50 |
| | Single elastic modulus (MPa) | 1300 | 1000 | 1000 | 700 | 700 | 700 |
| | Layer thickness (mm) | 0.9 | 0.9 | 0.8 | 0.8 | 0.7 | 0.6 |
| Overall characteristics | Fuel permeability (mg/m · day) | 0.2 | 0.2 | 0.1 | 0.1 | 0.1 | 0.1 |
| | Bending elastic modulus (MPa) | 1470 | 1200 | 1410 | 1150 | 1390 | 1540 |
| | Adhesive strength (N/cm) | Not separable | Not separable | Not separable | Not separable | Not separable | Not separable |

TABLE 2

|  |  | Example | | | | | |
|---|---|---|---|---|---|---|---|
|  |  | 2-1 | 2-2 | 2-3 | 2-4 | 2-5 | 2-6 |
| Inner layer | Composition MXD6 (wt %) | 100 | 100 | 100 | 100 | 100 | 100 |
|  | Single elastic modulus (MPa) | 3500 | 3500 | 3500 | 3500 | 3500 | 3500 |
|  | Layer thickness (mm) | 0.1 | 0.1 | 0.1 | 0.2 | 0.2 | 0.3 |
| Outer layer | Composition MXD6 (wt %) | 70 | 67 | 63 | 63 | 60 | 60 |
|  | Olefin polymer component (wt %) | 30 | 28 | 27 | 27 | 25 | 25 |
|  | Plasticizer (wt %) | 0 | 5 | 10 | 10 | 15 | 15 |
|  | Single elastic modulus (MPa) | 1600 | 1350 | 1100 | 1100 | 600 | 600 |
|  | Layer thickness (mm) | 0.9 | 0.9 | 0.9 | 0.8 | 0.8 | 0.7 |
| Overall characteristics | Fuel permeability (mg/m · day) | 0.2 | 0.3 | 0.3 | 0.1 | 0.1 | 0.1 |
|  | Bending elastic modulus (MPa) | 1700 | 1490 | 1310 | 1530 | 1100 | 1330 |
|  | Adhesive strength (N/cm) | Not separable | Not separable | Not separable | Not separable | Not separable | Not separable |

TABLE 3

|  |  | Comparative Example | | | | | | |
|---|---|---|---|---|---|---|---|---|
|  |  | 1-1 | 1-2 | 1-3 | 2-1 | 2-2 | 2-3 | 3 |
| Single layer | Composition PPS (wt %) | 100 | 80 | 70 | 0 | 0 | 0 | 0 |
|  | MXD6 (wt %) | 0 | 0 | 0 | 100 | 75 | 70 | 0 |
|  | Olefin polymer component (wt %) | 0 | 20 | 30 | 0 | 25 | 30 | 0 |
|  | PA11 (wt %) | 0 | 0 | 0 | 0 | 0 | 0 | 100 |
|  | Single elastic modulus (MPa) | 3300 | 1800 | 1300 | 3500 | 1900 | 1600 | 500 |
|  | Layer thickness (mm) | 1.0 | 1.0 | 1.0 | 1.0 | 1.0 | 1.0 | 1.0 |
| Overall characteristics | Fuel permeability (mg/m · day) | 0.02 | 5.7 | 97 | 0.02 | 4.2 | 9 | 30 |
|  | Bending elastic modulus (MPa) | 3300 | 1800 | 1300 | 3500 | 1900 | 1600 | 500 |

TABLE 4

|  |  | Comparative Example | | |
|---|---|---|---|---|
|  |  | 4 | 5 | 6 |
| Inner layer | Composition ETFE (wt %) | 100 | 0 | 0 |
|  | EVOH (wt %) | 0 | 100 | 0 |
|  | PPS (wt %) | 0 | 0 | 100 |
|  | Single elastic modulus (MPa) | 1400 | 3200 | 2400 |
|  | Layer thickness (mm) | 0.2 | 0.2 | 0.15 |
| Adhesive layer | PPS/PA11 (PPS is rich) | — | — | 100 |
|  | Layer thickness (mm) | — | — | 0.1 |
| Outer layer | Composition PA12 (wt %) | 100 | 0 | 0 |
|  | PA11 (wt %) | 0 | 0 | 100 |
|  | PE (wt %) | 0 | 100 | 0 |
|  | Single elastic modulus (MPa) | 400 | 750 | 500 |
|  | Layer thickness (mm) | 0.8 | 0.8 | 0.75 |
| Overall characteristics | Fuel permeability (mg/m · day) | 1.1 | 0.2 | 0.1 |
|  | Bending elastic modulus (MPa) | 600 | 1200 | 800 |
|  | Adhesive strength (N/cm) | Not separable | 26 | 29 |

The fuel tube 1 in each of Examples 1-1 to 1-6 shown in Table 1 is a laminate of an inner layer 2 and an outer layer 3. The inner layer 2 is made of a resin composition containing a PPS resin as a main component but substantially containing no olefin polymer component. The outer layer 3 is made of a resin composition containing a PPS resin as a main component and substantially containing an ethylene-glycidyl methacrylate copolymer and an ethylene-butene copolymer. The fuel tube 1 in each of Examples 2-1 to 2-6 shown in Table 2 is a laminate of an inner layer 2 and an outer layer 3. The inner layer 2 is made of a resin composition containing an MXD6 resin as a main component but substantially containing no olefin polymer component. The outer layer 3 is made of a resin composition containing an MXD6 resin as a main component and substantially containing a maleic acid-modified ethylene-butene copolymer. N-butyl-benzene sulfonamide is used as a plasticizer. In Table 3, PA11 is a polyamide-11 resin. In Table 4, ETFE is a fluororesin which is an ethylene-tetrafluoroethylene copolymer, EVOH is an ethylene-vinyl alcohol copolymer resin, PA12 is a polyamide-12 resin, and PE is a polyethylene resin.

[Method for Producing Fuel Tube]

The single-layer fuel tube was extrusion-molded by use of an extrusion molding apparatus including an extruder for discharging a resin composition, a die for extruding the discharged resin composition in the form of a tube, a sizing die for controlling the size of the extruded tube while cooling the extruded tube, and a take-up.

The fuel tube of the type produced by lamination of the inner layer and the outer layer without interposition of any adhesive agent was extrusion-molded by use of an extrusion molding apparatus including two extruders for discharging two resin compositions respectively, a die for molding the resin compositions in the form of a tube while collecting the resin compositions by an adapter, a sizing die for controlling the size of the extruded tube while cooling the extruded tube, and a take-up.

The fuel tube of the type produced by lamination of the inner layer and the outer layer through an adhesive layer was extrusion-molded by use of an extrusion molding apparatus including extruders of the number corresponding to the number of layers or materials for discharging resin compositions respectively, a die for molding the resin compositions in the form of a tube while collecting the resin compositions by an adapter, a sizing die for controlling the size of the extruded tube while cooling the extruded tube, and a take-up.

[Measurement of Fuel Permeability]

The fuel tube 1 was cut to prepare a 1000 mm-long test tube. One end of the test tube was stoppered. Toluene, isooctane and ethanol were mixed at a volume ratio of 45:45:10 to prepare sample fuel. The sample fuel was injected into the test tube so as to occupy 90% or more of the inner volume of the test tube. The other end of the test tube was stoppered. After the sample fuel was pre-treated at 65° C. for 168 hours, the sample fuel was exchanged for new one having the same composition. The test tube was stoppered again. After the total weight of the test tube was measured, the test tube was put in a high-temperature tank at 60° C. so that change in weight of the test tube was measured. The amount (mg) of permeated gasoline per day and per 1000 mm length of the tube was calculated to thereby evaluate fuel permeability. Results of the measurement are shown in Tables 1 to 4.

[Measurement of Bending Elastic Modulus]

The fuel tube 1 was cut to prepare a 280 mm-long test tube. The bending elastic modulus of the test tube was measured by a method according to JIS K7171 (method of testing bending characteristic of plastics). Incidentally, the distance between fulcrums was set at 162 mm and R57 was used as an indenter.

[Measurement of Adhesive Strength]

The fuel tube 1 was cut to prepare a test piece shaped like a strip of paper 5 mm wide and 100 mm long. The inner and outer layers at an end of the test piece were peeled from each other. The inner and outer layers peeled thus were clamped in a chuck of a tensile tester. Peeling strength (N/cm) against tensile stress in a direction of 180° at a speed of 10 mm/min was measured to thereby evaluate adhesive strength. Results of the measurement are shown in Tables 1 to 4.

According to the fuel tube 1 in each of Examples 1-1 to 1-6 and Examples 2-1 to 2-6, the following operation and effect can be obtained.

(1) A good balance between the two characteristics of low fuel permeability and high flexibility can be attained successfully.

In the case where the fuel tube has a single layer of a PPS or MXD6 resin as shown in each of Comparative Examples 1-1 and 2-1, fuel permeability is low but flexibility runs short because the bending elastic modulus is high. Moreover, when an olefin polymer component is mixed with the PPS or MXD6 resin as shown in each of Comparative Examples 1-2 and 2-2, flexibility increases because the bending elastic modulus is lowered, but fuel permeability is worsened severely. In addition, in Comparative Example 3, the bending elastic modulus is sufficiently low but fuel permeability is high. On the contrary, in each of Examples 1-1 to 1-6 and Examples 2-1 to 2-6, a good balance between low fuel permeability and high flexibility can be obtained successfully.

Incidentally, fuel permeability of 0.5 mg/m·day or lower is preferred, and fuel permeability of 0.3 mg/m·day or lower is especially preferred. All Examples exhibit fuel permeability in the especially preferred range. In addition, a bending elastic modulus of 1500 MPa or smaller is preferred, and a bending elastic modulus of 1200 MPa or smaller is especially preferred. Examples 1-2, 1-4 and 2-5 exhibit the bending elastic modulus in the especially preferred range.

(2) The inner and outer layers are self-bonded to each other by sufficient interlayer adhesive power without interposition/addition of any adhesive agent.

In lamination in Comparative Example 4, adhesive power is sufficient but fuel permeability is high. In each of Comparative Examples 5 and 6, a good balance between low fuel permeability and high flexibility can be obtained by lamination but adhesive power is insufficient. Moreover, in Comparative Example 6, the adhesive agent is used. On the contrary, in each of Examples 1-1 to 1-6 and Examples 2-1 to 2-6, adhesive power is so high that the layers are evaluated as "not separable" because the outer layer 3 is destroyed at the time of the measurement.

Incidentally, the invention is not limited to the aforementioned embodiment. For example, changes and modifications may be made suitably as follows without departing from the spirit of the invention.

(1) The resin composition of the inner layer is made electrically conductive.

Figure 2:
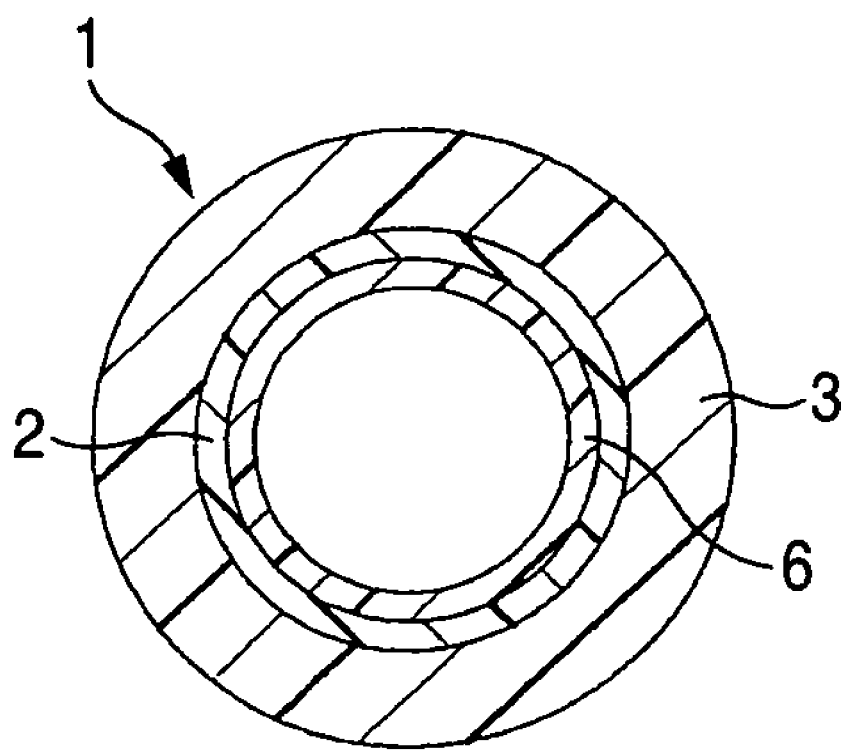
FIG. 2 is a sectional view showing a modified example of the fuel tube according to Examples.

(2) As shown in FIG. 2, an innermost layer 6 is added to the inner side of the inner layer 2. The resin composition of the innermost layer 6 is not particularly limited but the same resin composition as that of the outer layer 3 may be preferably used as the resin composition of the innermost layer 6.

What is claimed is:

1. A fuel tube comprising:
   a laminate of an inner layer made of a resin composition containing a low fuel permeability resin as a main component and containing substantially no olefin polymer component; and
   an outer layer made of a resin composition containing the low fuel permeability resin as a main component and containing substantially an olefin polymer component, wherein
   the inner layer and the outer layer are substantially self-bonded to each other without an adhesive agent, wherein
   the low fuel permeability resin is a PPS resin,
   the olefin polymer component of the outer layer is a combination of an epoxy group-containing olefin polymer and an ethylene-α-olefin copolymer, and
   the amount of the olefin copolymer component is in a range from 20 to 60% by weight.

2. The fuel tube according to claim 1, wherein the olefin polymer component is a combination of a ethylene-glycidyl methacrylate copolymer and an ethylene-butene copolymer.

3. The fuel tube according to claim 1, wherein the weight ratio of the epoxy group-containing olefin polymer and the ethylene-α-olefin copolymer is selected to be from 1:3.3 to 1:7.6.

4. The fuel tube according to claim 1, wherein the thickness of the inner layer is 0.05 to 0.4 mm.

5. The fuel tube according to claim 1, wherein at least one part of the fuel tube is shaped like a bellows.

6. The fuel tube according to claim 1, wherein the inner layer is made electrically conductive.

7. The fuel tube according to claim 1, the fuel tube further comprising an innermost layer, wherein the innermost layer is added to the inner side of the inner layer.

8. The fuel tube according to claim 7, wherein the resin composition of the innermost layer is the same resin composition as that of the outer layer.

\* \* \* \* \*